United States Patent [19]

Rosenberger

[11] Patent Number: 4,966,097
[45] Date of Patent: Oct. 30, 1990

[54] ANIMAL CONTAINMENT SYSTEM

[76] Inventor: Edwin D. Rosenberger, 328 E. 5th St., Apt. 1, Brooklyn, N.Y. 11218

[21] Appl. No.: 169,011

[22] Filed: Mar. 16, 1988

[51] Int. Cl.⁵ .......................... A01K 1/00; E04C 3/00
[52] U.S. Cl. ....................................... 119/19; 119/17; 52/586; 52/286; 446/111; 446/112
[58] Field of Search ........................... 119/16, 17, 19; 446/108, 111, 112, 115, 110; 217/12 R, 13, 43 R; 220/4 F, 80; 52/586, 285, 286

[56] References Cited

U.S. PATENT DOCUMENTS

| | | | |
|---|---|---|---|
| 2,918,992 | 12/1959 | Gelsavage | 446/115 |
| 2,960,249 | 11/1960 | Walsh | 220/4 F |
| 3,182,847 | 5/1965 | Fuller | 220/80 |
| 3,283,348 | 11/1966 | Farmer et al. | 220/80 |
| 4,092,519 | 5/1978 | Eaton-Williams | 220/80 |
| 4,169,688 | 10/1979 | Toshio | 52/586 |
| 4,256,056 | 3/1981 | Sou | 119/19 |
| 4,269,005 | 5/1981 | Timmons | 52/586 |
| 4,461,395 | 7/1984 | Burnett | 220/4 F |

FOREIGN PATENT DOCUMENTS 221641  1/1958  Australia .................. 52/586

Primary Examiner—John Weiss
Attorney, Agent, or Firm—Richard L. Miller

[57] ABSTRACT

An animal containment system is designed to be constructed in any size desired for housing birds and animals. Primarily, it consists of an assembly composed of a plurality of enclosures that are constructed of interlocking frames that include panels that may be removed for cleaning purposes when soiled. Connector cleats are also provided for firmly securing the assembly together.

2 Claims, 1 Drawing Sheet

ANIMAL CONTAINMENT SYSTEM

BACKGROUND OF THE INVENTION

The instant invention relates generally to animal cages, and more particularly, to an animal containment system.

Numerous cages and the like have been provided in the prior art that are adapted to confine animals. For example, U.S. Pat. Nos. 3,662,713 of Sachs, 3,618,568 of Breeden, and 3,611,994 of Bailey, all are illustrative of such prior art. While these units may be suitable for the particular purpose to which they address, they would not be as suitable for the purpose of the present invention as hereafter described.

SUMMARY OF THE INVENTION

A primary object of the present invention is to provide an animal containment system that will overcome the shortcomings of the prior art devices.

Another object is to provide an animal containment system that will be of such design, as to be modular for housing birds or animals.

An additional object is to provide an animal containment system that will employ removable panels, enabling same to be cleaned while temporary panels are in place.

A further object is to provide an animal containment system that is simple and easy to use.

A still further object is to provide an animal containment system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
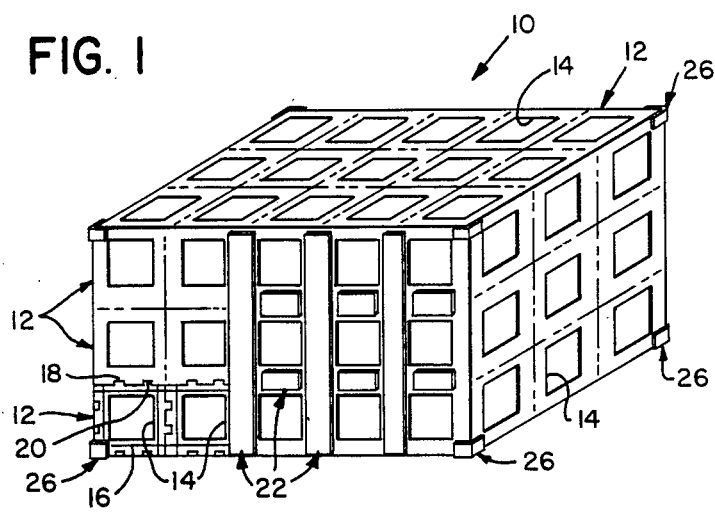
FIG. 1 is a perspective view of a typical rectangular containment system assembled out of components of the invention.
Figure 2:
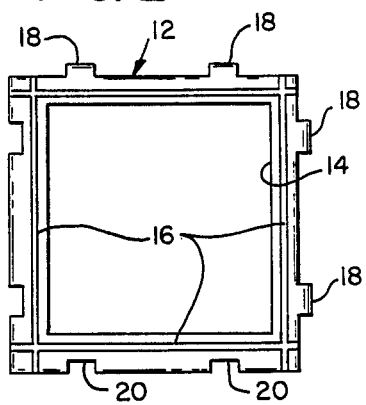
FIG. 2 is a plan view of one component used in FIG. 1.
Figure 3:
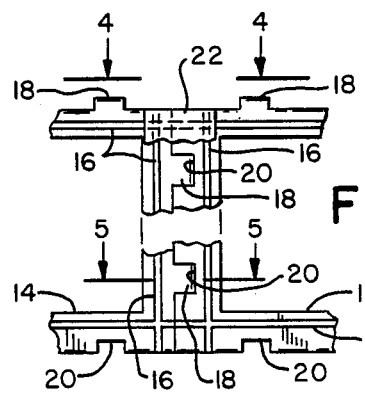
FIG. 3 is a fragmentary plan view of two typical components illustrating the joining mechanism.
Figure 6:
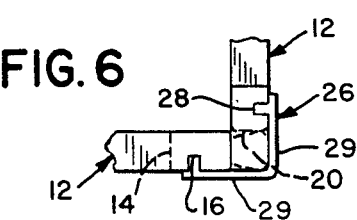
FIG. 6 is an enlarged edge view similar to FIG. 4 but taken at a corner.
Figure 4:
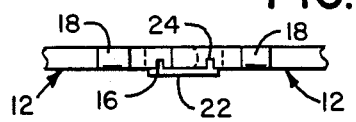
FIG. 4 is an edge view taken in the direction of arrow 4—4 in FIG. 3.
Figure 5:
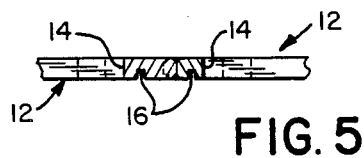
FIG. 5 is a cross sectional view taken on line 5—5 in FIG. 3.
Figure 7:
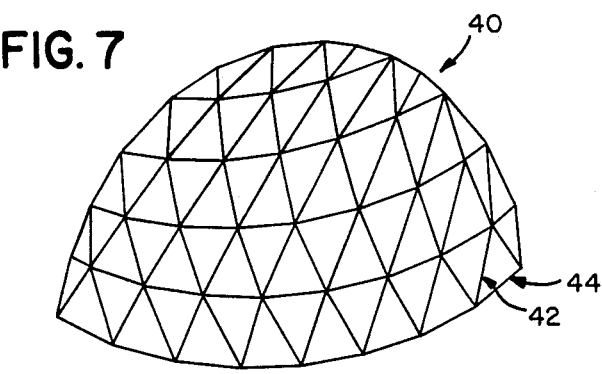
FIG. 7 is a diagrammatic perspective view of another embodiment of a typical dome containment assembled using the same scheme as illustrated in FIG. 1.
Figures 8, 10:
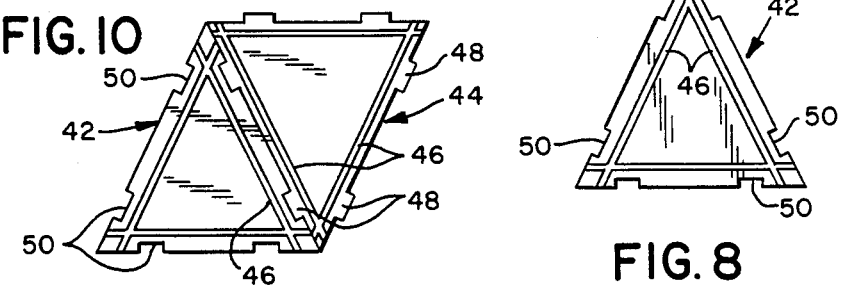
FIG. 8 & 9 illustrate typical components used in constructing a typical dome.
FIG. 10 illustrates how the components in FIGS. 8 & 9 interconnect.
Figure 9:
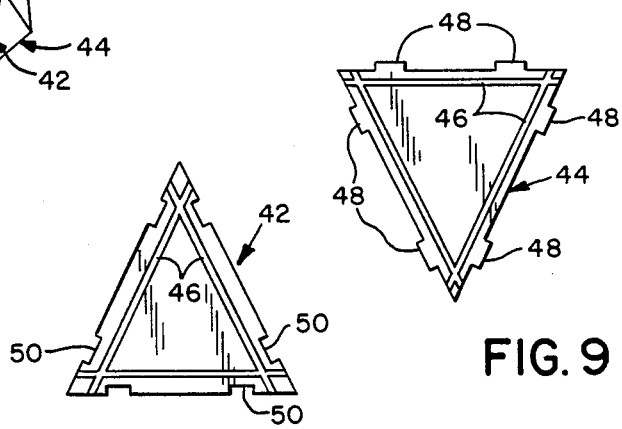

Turning now descriptively to the drawings, in which like reference characters denote like elements throughout the several views, a box assembly 10 is shown to include a plurality of frames 12 that interlock to form multiple enclosures for birds and animals. An opening 14 is provided through each frame 12, and two pairs of parallel grooves 16 are provided in the faces of frames 12. Normally, a clear panel of plastic, glass, bars, or screen (not shown) is securable into frame 12. One side of each of the enclosures forming the assembly 10, may be provided with a closely spaced wire mesh panel (not shown) that is provided with a door, and the above serves to provide additional ventilation for the birds and animals.

Tracks at the bottom of each enclosure, provides for receiving a sliding tray (not shown), and it shall be recognized that the panels on the enclosures may be so positioned, as to protect the animals and birds from environmental influences, such as drafts. Furthermore, some panels may be opaque for prevention of excess sunlight, and additional enclosures may be added to the assembly, which may be nesting structures, bathing structures, isolation partitions, and lighting may be employed; also perches, climate control, etc.

Spaced projections 18 are provided on a pair of adjacent edges of each frame 12, and are integrally attached thereto. Projections 18 are designed to engage with similarly spaced cut-out openings 20 on other adjacent edges of frames 12 for interlocking of frames 12 that form enclosures of the assembly 10.

A plurality of long and short connector cleats 22 are provided for vertical and horizontal coupling of the enclosures together to form the assembly 10, and each cleat 22 is provided with a pair of parallel spaced rails 24 that are integrally attached thereto, for being frictionally engaged within grooves 16 of adjacent frames 12, so as to render the enclosures firmly secured together.

A plurality of corner connector cleats 26 are also provided, and each leg portion 29 is provided with projecting rails 28 that engage in grooves 16 of frames 12, in the same manner described of cleats 22.

In use, assembly 10 is employed to house an animal or a bird in each of coupled enclosure, and when panels are soiled they are removed from the frame 12 for cleaning while similar temporary panels may be installed.

Referring now to FIGS. 7 through 10, a modified assembly 40 of dome shape is shown to include interlocking and triangular segments 42 and 44. Segments 42 and 44 are both provided with intersecting tracks 46 that are spaced from the edges of 42 and 44, for insertion of rails 24 of connector cleats for securing these panels together to form a unit in a manner similar to that previously described for the rectangular enclosure shown in FIG. 1. Segments 44 are also provided with integrally attached and spaced projections 48 that are engaged within similarly spaced cut-out openings 50 in the edges of segments 42, and this arrangement enables alternate interlocking of segments 42 and 44 for forming the assembly 40.

In use, segments 42 and 44 form enclosures similar to that described of assembly 10, with the exception, that 40 is dome shaped in configuration.

It shall also be noted that the segments 42 and 44 will vary in size because of the arcuate dome shape of the modified assembly 40.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An animal containment system, comprising, an assembly of a plurality of frame interconnected and forming an enclosure for the confinement of birds and animals, interlocking means provided on and in said frames, holding adjacent said frames together and connector cleat means firmly securing said enclosures together, wherein each frame of said plurality of frames is square in configuration and has a face formed with a central through-aperture for receiving a panel; said interlocking means comprises integrally attached and spaced projections on adjacent edges of said frame, and spaced cut-out openings are provided in other adjacent edges of said frame and engaged with said projections of an adjacent said frame, grooves are provided in faces of said frames and extend to said edges of said frames with grooves of adjacent frames in end-to-end alignment; said connector cleat means comprising long and short connector cleats each including parallel spaced apart rails integrally attached to a common side of each cleat with the rails of the short cleats being received in said grooves of adjacent single said frames and with the rails of respective long cleats received in aligned grooves of a series of adjacent frames so that the short cleats releasably attach individual frames together and the long cleats releasably attach the series of adjacent frames together.

2. An animal containment system as set forth in claim 1 wherein said connector cleat means further comprises corner connector cleats, having orthogonal legs provided with integrally attached and parallel second rails that also engage within said grooves of said frames in corners of said assembly.

* * * * *